United States Patent Office 3,354,111
Patented Nov. 21, 1967

3,354,111
PIGMENT DISPERSIONS
William B. Henderson and Gerd R. Baur, Decatur, Ala., assignors to Monsanto Company, St. Louis, Mo., a corporation of Delaware
No Drawing. Filed Apr. 20, 1964, Ser. No. 361,250
8 Claims. (Cl. 260—32.6)

The present invention relates to new and improved pigment dispersions and to a method of facilitating the dispersion of pigments throughout synthetic, linear polymers and shaped articles prepared therefrom, such as filaments and fibers.

The use of pigments in coloring textiles is historically very old, but such use was of little commercial importance, outside of specialty applications, until pigmented water-in-lacquer emulsion printing paste were introduced about 1938. Since then, the use of pigments for coloring textiles has expanded considerably, especially in "dope dyeing" of synthetics. By dope dyeing is meant the incorporation of pigments in the spinning solutions before actual formation of the fibers. Such a method of coloring fibers offers several advantages over conventional dyeing, among which may be mentioned the exceptional light and wash fastness obtainable by having the color dispersed throughout the fiber. Of equal importance is the fact that colored fibers could be produced somewhat cheaper by elimination of the expensive dyeing operations now necessary with synthetic, linear polymers and shaped articles therefrom. This incorporation of color into spinning solutions has increased the demand for satisfactory pigment dispersants and for methods of dispersion.

It is an object of the present invention to provide a new and novel pigment dispersant.

It is another object of this invention to provide an economical and practical process for affecting the uniform dispersion of pigments throughout synthetic, linear polymers.

It is a further object of this invention to provide a process for the uniform coloration of shaped articles, such as fibers and filaments, from synthetic, linear polymers.

Other objects and advantages will be apparent from the description of the invention given hereinafter.

In general, these and other objects of the invention are accomplished by dispersing finely divided pigment in a high molecular weight, N,N-dialkyl amide or mixtures of said amides and the resulting dispersion may be mixed with an appropriate solvent and a synthetic, linear polymer to form a solution for the production of shaped articles therefrom.

The amide-pigment dispersion employed in the practice of this invention can be prepared by several methods. It is convenient to "flush" a commercial pigment press cake with an N,N-dialkyl amide to form the desired dispersion. In processing commercial pigments they are often worked into an aqueous suspension, which is pressed into a paste-like cake containing from about 20 to about 30 percent of pigment solids. A suitable N,N-dialkyl amide is mixed with the press cake. Additional water may be added to the press cake to form a light slurry which is more easily agitated with the amide. The mixture is agitated at high speeds, for example 5000 f.p.m. radial velocity, which causes the N,N-dialkyl amide to emulsify as a layer that is lighter than the water. When this happens the water and pigment separate and the pigment is taken up by the emulsified amide layer and the water separates as a heavier layer with very little or no pigment content. The N,N-dialkyl amide and water are immiscible, therefore the pigment is separated from the water and transferred to the amide. The excess water may then be decanted off and residual water may be driven off by heating under a vacuum, or by heating at atmospheric pressure at 100° C. The final residual water content is generally less than one percent, although up to 3 percent water is tolerable. The use of the above identified "flush" method is very advantageous as far as economics and better particle size are concerned. The use of the amides of this invention are desirable because of their ease of use and their general applicability with various polymeric and resinous systems.

An alternative method is to mechanically mix finely divided dry pigment with a suitable N,N-dialkyl amide until a homogeneous dispersion is obtained. The resultant pigment-amide dispersion is then mixed with an appropriate solvent and polymer under high shear agitation to form a solution for the production of shaped articles, such as filaments and fibers. In the preparation of fibers, the resulting pigmented solution provides good spinning stability, good candle life, no pigment bleeding in the spin bath and the subsequent fiber properties are equivalent to standard unpigmented vinyl fibers.

The pigment dispersions of this invention show a decided improvement over the prior art dispersion. The pigment particles are finely divided, the particles size being less than 10 microns, preferably less than 1 micron, and are well dispersed with the N,N-dialkyl amides of this invention. Any well known mixing or grinding method may be used to disperse the pigment.

The pigment dispersions of this invention may contain from about 10 to 50 percent by weight of pigment and from about 50 to 90 percent by weight of N,N-dialkyl amide. It is preferred that the dispersions of this invention contain from about 30 to 40 percent by weight of pigment and from about 60 to 70 percent by weight of the amide. It is preferable in order to facilitate pumping and metering of the pigment dispersions to thin the dispersions with an organic solvent which is inert to the pigment and compatible with the composition to be pigmented prior to adding to polymer solutions in the preparation of pigmented shaped articles. These thinned pigment dispersions should contain from about 1.0 to 15 percent by weight of pigment and from about 1.0 to 15 percent by weight of amide, the remainder being the organic solvent. Preferably, the thinned pigment dispersions will contain from about 6.5 to 12 percent by weight of pigment and from about 5 to 9.5 percent by weight of amide, the remainder being the organic solvent. The higher concentrations of pigment are preferred but it is not advisable to have a solids content much beyond 30 percent in that it is difficult to keep the resulting paste in a fluid condition. Small amounts of an appropriate polymer may be added to the thinned dispersions to increase the viscosity if desired.

The amount of thinned pigment dispersion which is admixed with an appropriate solvent and polymer to form solutions for the production of shaped articles can vary widely depending upon the relative concentration of the pigment in the dispersion and the intensity of color desired in the ultimate product. Normally, the thinned dispersion is employed in an amount sufficient to give about 0.01 to about 5.0 percent by weight, based on the total weight of the pigmented shaped article, of pigment in the final shaped article. It is preferable to produce a final shaped article containing from about 0.5 to 3.0 percent by weight of pigment, based on the total weight of the pigmented shaped article.

The N,N-dialkylamides which constitute an essential part of this invention are amides having the formula

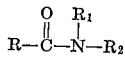

wherein R is a hydrocarbon radical containing at least 6 carbon atoms and $R_1$ and $R_2$ are lower alkyl radicals. Preferably, R will contain from 11 to 21 carbon atoms and $R_1$ and $R_2$ will be methyl radicals. Illustrative of suitable saturated amides that may be used in the preparation of the compositions of the invention are N,N-dimethylcaprylamide,
N,N-diethylcaprylamide,
N,N-dimethyllauramide,
N,N-dimethylmyristamide,
N-methyl-N-ethylmyristamide,
N,N-diethyldodecamide,
N,N-dimethylpalmitamide,
N,N-dipropylheptadecamide,
N,N-dimethylstearamide,
N-methyl-N-ethyldocosamide, and the like.

Illustrative of suitable unsaturated amides that may be used in the preparation of the compositions of this invention are N,N-dimethylpalmitoleamide,
N,N-dimethyloleamide,
N,N-dibutyloleamide,
N,N-dimethyllinoleamide,
N,N-diethyllinoleamide,
N-methyl-N-butylpropyllinolenamide,
N,N-dimethyllinolenamide, and the like.

Mixtures of the above amides may also be used. These compounds may be prepared by reacting an acid anhydride with a dialkyl amine such as dimethylamine.

Any suitable organic or inorganic pigment can be used in the application of this invention provided such pigment may be satisfactorily employed to produce color in synthetic, linear polymers and shaped articles therefrom. Preferred organic pigments for incorporation in the synthetic, linear polymers in accordance with this invention include the insoluble azo group among which may be mentioned Pigment Blue WNL (CI 21180), Benzidine Toluidide Yellow (CI 21095); anthraquinone and vat pigments, for example Madder Lake (CI 58000), Thio Fast Red MU–6606 (CI 73310), Indanthrone Yellow GK (CI 61725), Indanthrone Blue, Green Shade (CI 69810) and Thioindigo Red (CI 73310); Phthalocyanine pigments such as Phthalocyanine Green (CI 74260), Phthalocyanine Blue (CI 74160), and Zona Blue (CI 74160); and miscellaneous organic pigments not otherwise classified such as Acrylamino Yellow, which is described in U.S. Patent No. 2,727,044. Soluble azo, basic and condensation acid pigments are suitable although not preferred since such pigments are soluble in some commonly used solvents. Applicable inorganic pigments include titanium dioxide, zinc oxide, aluminum oxide, magnesium oxide, iron oxides, lithopone, ultramarines, lead chromate, cadmium sulfide, cadmium selenide, barium sulfate, and carbon blacks.

The synthetic, linear polymers for which this invention are applicable include polyamides, acrylonitrile polymers, polyesters, polyurethanes, and the like. Suitable polyamides are those produced from a linear polymer containing recurring units of the formula:

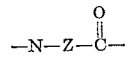

wherein Z is a member of the class consisting of a divalent hydrocarbon radical and a divalent radical of the formula

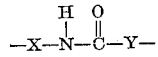

wherein X and Y are divalent hydrocarbon radicals. Typical polyamides and processes for their production are described in U.S. Patent Nos. 2,071,250; 2,071,253 and 2,130,948.

Suitable acrylonitrile polymers include any polymer of acrylonitrile including polyacrylonitrile wherein the acrylonitrile component constitutes about 35 percent or more of the polymer molecule calculated as $CH_2=CH-CN$.

Many of the ethylenically unsaturated compounds which are suitable as the additional constituent in forming useful copolymers with acrylonitrile are listed in U.S. Patent Nos. 2,837,501; 2,486,241; and 2,436,926.

Suitable polyesters include polyethylene terephthalate, polyethylene terephthalate copolyesters prepared using polyethylene glycols such as polyethylene glycols having molecular weights of 150 to about 6,000, or polyethers such as the dicarboxymethyl acid of polytetramethylene oxide or the esters of polytetramethylene oxide, polydioxaline, or polyesters prepared using other acids such as bibenzoic, isophthalic or ethylenebis-p-oxybenzoic acids. Such materials are described in U.S. Patent No. 2,465,319.

Suitable polyurethanes include polymers prepared by reacting a low molecular weight polymer having a molecular weight of about 1500 to 5000 and having terminal hydroxyl groups with a diisocyanate and extended with a compound containing active hydrogens. Typical polyurethanes and processes for their production are described in U.S. Patent Nos. 2,850,467; 2,929,800; 2,983,702; and 3,115,384.

The pigment dispersions of this invention are applicable to any form of shaped article including foams, filaments, fabric, yarn, tow, staple, films, plastic sheeting, molding compositions, and the like. The use of the pigment dispersions of this invention to incorporate pigments into shaped articles is limited only by the conditions used during the preparation of the shaped article in question. Since the amides which are an essential part of the pigment dispersions of this invention are thermally stable up to temperatures of about 200° C., the teachings of this invention could not be used in operations, such as the melt spinning of fibers, in which temperatures above about 200° C. are used.

The pigment dispersions of this invention are particularly applicable to the preparation of pigmented fibers and filaments by the well known conventional wet and dry spinning and various combinations of these methods. Generally, spinning solutions are prepared containing the desired synthetic, linear polymer dissolved in a suitable solvent for the polymer and containing a pigment properly dispersed therein. Filaments are spun by extruding the solution of polymer through an orifice, or a spinnerette having a plurality of orifices, into a medium which removes the solvent. The medium into which the solution is extruded and which removes the solvent may be either liquid or gaseous or a mixture of liquid and gas. The method involving the use of a liquid coagulant is known as wet spinning and any liquid which is a non-solvent for the polymer but which removes or converts the polymer solvent into soluble compounds may be used. The method involving the use of a gaseous method is known as dry spinning and according to that method air, steam, nitrogen or other gas or mixtures of gases which are inert at the spinning temperature are used to remove the solvent by evaporation from the surface of the fiber or filament. A number of variations of the two methods may be used. For example, a combination of a gas and liquid in the form of a fog may be used to coagulate the spinning solution. Any solvent for the particular polymer to be used which is inert with respect to the pigment dispersion may be used to prepare the pigmented filaments and fibers discussed above. Suitable solvents include N,N-dimethylacetamide, N,N-dimethylformamide, and the like.

The invention is further illustrated by the following examples in which all parts and percents are by weight unless otherwise indicated. These examples are intended to be illustrative only and not as limitations on the scope of the invention. The candle pressure discussed in the examples is that pressure required to push the process dope stream through the candle filter plus the backup pressure from the jet filter. The significance of candle pressure is that only a maximum of about 350 to 400 p.s.i.g. can be tolerated because of equipment limitations and potential damage to spinnerettes as a result of filter cloth rupture letting large particles through to plug spinnerette holes.

*Example 1*

Six hundred and eighty-one grams of a molten amide mixture comprising 50 percent by weight of N,N-dimethylstearamide, 40 percent by weight of N,N-dimethylpalmitamide, 5 percent by weight of N,N-dimethylmyristamide, and 5 percent by weight of N,N-dimethyloleamide and 2,270 grams of Phthalocyanine Green (CI Pigment Green 7, CI 74260) press cake containing about 25 percent pigment, the remainder being primarily water, were agitated for approximately 10 to 15 minutes until the amide mixture was completely emulsified and the mixture separated into two layers, an amide-pigment layer and a water layer. The water was then decanted off and the amide-pigment layer was heated in a vacuum oven under an absolute pressure of 25 inches of mercury at a temperature of 100° C. for 3 hours. The resulting dispersion contained approximately 50 percent pigment and 50 percent amide mixture and was found to contain 0.57 percent by weight water.

The pigment dispersion was then mixed with dimethylacetamide to give a thinned batch containing 7.5 percent by weight of pigment, 7.5 percent by weight of the amide mixture, and 85 percent by weight of dimethylacetamide. This thinned batch was agitated at high speeds for approximately 90 minutes. One thousand three hundred and eleven grams of this thinned batch was blended with 40 lbs. of a solution containing 26 percent of acrylonitrile copolymer comprising 93 percent polyacrylonitrile and 7 percent vinyl acetate dissolved in dimethylacetamide. A pigmented fiber was easily wet spun from the resulting spinning solution. Spinning stability and fiber color were good, there was no pigment bleeding in the spin bath, and the candle pressure increase was found to be only 30 p.s.i. over a 16 hour period.

*Example 2*

Thirty grams of the molten amide mixture of Example 1 was dissolved in 340 grams of dimethylacetamide in a Cowles-Dissolver. Then 30 grams of Columbian Carbon Company No. 999 Carbon Black fluff (CI Pigment Black 7, CI 77266) was added to the mixture and the mixture was agitated for approximately 75 minutes. This produced a thinned dispersion containing 85 percent by weight of dimethylacetamide, 7.5 percent by weight of the amide mixture and 7.5 percent by weight of the carbon black pigment. The thinned dispersion was blended into a spinning solution comprising approximately 25 percent of an acrylonitrile copolymer containing 93 percent polyacrylonitrile and 7 percent vinyl acetate dissolved in dimethylacetamide from which a fiber was easily wet spun containing 2.75 percent of carbon black pigment. The initial candle pressure was 40 p.s.i.g. and the candle pressure increase was zero for 1 hour and 30 minutes spinning period followed by a gradual rise of 85 p.s.i. over a 22 hour period. There was no pigment bleeding in the spin bath and the fiber luster and color were good. Dispersions prepared similarly without amide mixture being added give about 150 to 200 p.s.i.g. initial candle pressure and a rise of several hundred p.s.i. in 3 to 4 hours spinning time.

*Example 3*

A thinned dispersion was prepared following the procedure of Example 2 using 300 grams of dimethylacetamide, 40 grams of molten amide mixture, 30 grams of Columbian Carbon Company No. 999 Carbon Black fluff pigment (CI Pigment Black 7, CI 77266) and 30 grams of an acrylonitrile copolymer containing 93 percent polyacrylonitrile and 7 percent vinyl acetate. This produced a thinned dispersion containing 75 percent of dimethylacetamide, 10 percent of the amide mixture, 7.5 percent of the carbon black pigment and 7.5 percent of the acrylonitrile copolymer. The thinned dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 2.75 percent pigment. The initial candle pressure was 30 p.s.i.g. and the candle pressure increase was 20 p.s.i. for a 3 hour and 40 minutes spinning period. There was no pigment bleeding in the spin bath and the fiber luster and color were good.

*Example 4*

The procedure of Example 2 was repeated using 40 grams of a molten amide mixture comprising 80 percent of N,N-dimethyloleamide, 5 percent of N,N-dimethylmyristamide, 5 percent of N,N-dimethylpalmitamide, 5 percent of N,N-dimethylstearamide, and 5 percent of N,N-dimethyllinoleamide and 30 grams of Phthalocyanine Blue B4700 (CI Pigment Blue 15, CI 74160) as the pigment. A fiber was produced following procedure of Example 2 containing 2.75 percent blue pigment. There was no pigment bleeding in the spin bath and the fiber luster and color were good. The initial candle pressure was 100 p.s.i.g. and there was no candle pressure increase for a 50 minute spinning period.

*Example 5*

The procedure of Example 2 was repeated using 130 grams of the amide mixture of Example 5 and 30 grams of Phthalocyanine Blue B4700 (CI Pigment Blue 15, CI 74160) as the pigment. A fiber was produced following the procedure of Example 2 containing 2.25 percent blue pigment. The initial candle pressure was 80 p.s.i.g. and there was no candle pressure increase for a 50 minute spinning period. There was no pigment bleeding in the spin bath and the fiber luster and color were good.

*Example 6*

A thinned dispersion containing 77.5 percent of dimethylacetamide, 9 percent of the amide mixture of Example 1 and 13.5 percent of Phthalocyanine Blue BT-284D (CI Pigment Blue 15, CI 74160) was prepared following the procedure of Example 2. The thinned dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 1.33 percent blue pigment. The candle pressure values, fiber color and fiber luster of the fiber produced were good.

*Example 7*

A thinned dispersion containing 82.5 percent of dimethylacetamide, 8.75 percent of the amide mixture of Example 1 and 8.75 percent of Columbian Carbon Company Carbon Black Peerless-155 pigment (CI Pigment Black 7, CI 77266) was prepared following the procedure of Example 2. The thinned dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 2.75 percent black pigment. The candle pressure values, fiber color and fiber luster of the fiber produced were good.

*Example 8*

A thinned dispersion comprising 74.8 percent of dimethylacetamide, 10.3 percent of the amide mixture of Example 1 and 10.3 percent of Harmon Textile Yellow Y-5776 was prepared following the procedure of Example 2. The dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 0.7 percent yellow pigment. The candle pressure values, fiber color and fiber luster for the fiber produced above were good.

Example 9

A thinned dispersion comprising 76 percent of dimethyl acetamide, 8 percent of the amide mixture of Example 1, 8 percent of Thio Fast Red MV–6606 pigment (CI Pigment Red 87, CI 73310), and 8 percent of an acrylonitrile copolymer containing 93 percent polyacrylonitrile and 7 percent vinyl acetate was prepared following the procedure of Example 2. The dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 2.0 percent red pigment. The candle pressure values, fiber color and fiber luster of the fiber produced were good.

Example 10

A thinned dispersion was prepared following the procedure of Example 9 using Phthalocyanine Green G–5015 (CI Pigment Green 7, CI 74260) as the pigment. The dispersion was blended into a spinning solution comprising 25 percent of acrylonitrile copolymer containing 93 percent polyacrylonitrile and 7 percent vinyl acetate dissolved in dimethylacetamide from which a fiber was easily wet spun containing 2.0 percent green pigment. The candle pressure values, fiber color and fiber luster of the fiber produced were good.

Example 11

A thinned dispersion was prepared following procedure of Example 9 using the high molecular weight azo red Chromaphtal Red BR as the pigment. The thinned dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 2.0 percent red pigment. The candle pressure values, fiber color and fiber luster of the fiber produced were good.

Example 12

A thinned dispersion was prepared following procedure of Example 9 using Moly Orange YE 421D (CI Pigment Orange 21, CI 77601) as the pigment. The thinned dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 3.0 percent orange pigment. The candle pressure values, fiber color and fiber luster of the fibers produced were good.

Example 13

A thinned dispersion containing 75 percent of dimethylacetamide, 12.5 percent of the amide mixture of Example 1, 6.34 percent of Columbian Carbon Company No. 999 Carbon Black fluff pigment (CI Pigment Black 7, CI 77266), 3.19 percent of Thio Fast Red MV–6606 (CI Pigment Red 87, CI 73310) pigment and 2.97 percent of Zona Blue B–4700 (CI Pigment Blue 15, CI 74160) was prepared following the procedure of Example 2. The dispersion was blended into a spinning solution comprising 25 percent of an acrylonitrile copolymer containing 93 percent polyacrylonitrile and 7 percent vinyl acetate dissolved in dimethylacetamide from which a fiber was easily wet spun containing 0.164 percent of the Thio Fast Red Pigment, 0.153 of the Zona Blue pigment and 0.326 of the Carbon Black pigment. The candle pressure values, fiber color and fiber luster for the fiber produced were good.

Example 14

Thirteen hundred and fifty grams of Phthalocyanine Blue B–4700 (CI Pigment Blue 15, CI 74160) pigment press cake containing about 30 percent pigment, the remainder being water, was mixed with additional water to convert the originally paste-like consistency of the press cake to a light slurry consistency. To this aqueous slurry was then added 600 grams of a molten amide mixture comprising approximately 50 percent N,N-dimethylstearamide, 40 percent N,N-dimethyl palmitamide, 5 percent N,N-dimethyl myristamide, and 5 percent N,N-dimethyl oleamide. The mixture was agitated for approximately 10 to 15 minutes until it was completely emulsified, then allowed to stand and separate into two layers, a water layer and an amide-pigment layer. The water layer was decanted and discarded while the amide-pigment fraction was heated in a vacuum oven for 3 hours at a temperature of 100° C. and under an absolute pressure of 25 inches of mercury. The resulting dispersion contained approximately 40 percent pigment and 60 percent amide, with less than 1 percent water remaining in the mixture.

Six hundred grams of the said pigment dispersion was then added to 3400 grams of dimethylacetamide and agitated for 90 minutes to produce a thinned pigment batch containing about 6 percent pigment, 9 percent amide, and 85 percent dimethylacetamide. A pigment master batch was then produced by adding 2000 grams of the thinned pigment batch to 1800 grams of a 20 percent solids solution of a polyurethane dissolved in dimethylacetamide and agitating the mixture for about 30 minutes to obtain a uniform dispersion of the pigment and polyurethane. The final spinning solution was produced by adding 133 grams of the pigmented polyurethane master batch to 3000 grams of a 20 percent solids solution of a polyurethane dissolved in dimethylacetamide and agitating to obtain uniform distribution of the pigment. A pigmented polyurethane fiber was easily wet spun from this solution according to conventional wet spinning techniques. Spinning stability and fiber color were good, and there was no evidence of pigment bleeding in the spin bath.

The polyurethane composition used in the above example was prepared by reacting a polyesterdiol, p,p'-methylene diphenyl diisocyanate, and carbodihydrazide to give an elastic polyurethane polymer.

It will be apparent that many widely different embodiments of this invention may be made without departing from the spirit and scope thereof, and therefore, it is not intended to be limited except as indicated in the appended claims.

What is claimed is:

1. A solution suitable for the production of shaped articles comprising a dispersion of from about 10 to 50 percent by weight of finely divided pigment in from about 50 to 90 percent by weight of an amide selected from the group consisting of amides having the formula

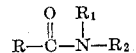

wherein R is a hydrocarbon radical containing from about 11 to 21 carbon atoms and $R_1$ and $R_2$ are lower alkyl radicals of 1 to 4 carbon atoms and mixtures of said amides in a solution of a synthetic linear polymer, said dispersion being present in amounts sufficient to provide about 0.01 to 5.0 percent by weight of pigment in a shaped article prepared from said solution.

2. The solution as defined in claim 1 wherein the synthetic linear polymer is an acrylonitrile polymer.

3. The solution as defined in claim 1 wherein the synthetic linear polymer is a polyurethane polymer.

4. A pigment dispersion comprising a suspension of from about 10 to 50 percent by weight of a finely divided pigment dispersed with from about 50 to 90 percent by weight of a member selected from the group consisting of amides having the formula

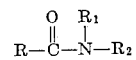

wherein R is a hydrocarbon radical containing from about 11 to 21 carbon atoms and $R_1$ and $R_2$ are lower alkyl radicals of 1 to 4 carbon atoms and mixtures of said amides.

5. A pigment dispersion comprising a suspension of from about 10 to 50 percent by weight of pigment dispersed with from about 50 to 90 percent by weight of a member selected from the group consisting of amides having the formula

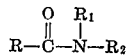

wherein R is a hydrocarbon radical containing from about 11 to 21 carbon atoms and $R_1$ and $R_2$ are methyl radicals and mixtures of said amides.

6. A pigment dispersion comprising a suspension of from about 1 to 15 percent by weight of a pigment dispersed with from about 1 to 15 percent by weight of a member selected from the group consisting of amides having the formula

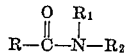

wherein R is a hydrocarbon radical containing about 11 to 21 carbon atoms and $R_1$ and $R_2$ are lower alkyl radicals of 1 to 4 carbon atoms and mixtures of said amides, the remainder being an organic solvent.

7. A pigment dispersion comprising a suspension of from about 1 to 15 percent by weight of a pigment dispersed with from about 1 to 15 percent by weight of a member selected from the group consisting of amides having the formula

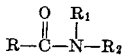

wherein R is a hydrocarbon radical containing from about 11 to 21 carbon atoms and $R_1$ and $R_2$ are methyl radicals and mixtures of said amides, the remainder being an organic solvent.

8. A pigment dispersion comprising a suspension of from about 6.5 to 12 percent by weight of a pigment dispersed with from about 5 to 9.5 percent by weight of a member selected from the group consisting of amides having the formula

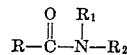

wherein R is a hydrocarbon radical containing from about 11 to 21 carbon atoms and $R_1$ and $R_2$ are methyl radicals and mixtures of said amides, the remainder being an organic solvent.

References Cited
UNITED STATES PATENTS

| | | | |
|---|---|---|---|
| 2,126,925 | 8/1938 | Ryan et al. | 106—308 |
| 2,225,604 | 12/1940 | Lubs et al. | 260—23.6 |
| 2,325,947 | 8/1943 | Garvey | 260—32.6 |
| 2,415,356 | 2/1947 | Kellog et al. | 260—32.6 |
| 2,941,970 | 6/1960 | Craig | 260—34.2 |

FOREIGN PATENTS 730,393  5/1955  Great Britain.

OTHER REFERENCES

Mattiello: Protective and Decorative Coatings; vol. III; John Wiley & Sons, Inc.; page 727; 1943.

MORRIS LIEBMAN, *Primary Examiner.*

L. T. JACOBS, *Assistant Examiner.*